US007115870B2

(12) United States Patent
Caron et al.

(10) Patent No.: US 7,115,870 B2
(45) Date of Patent: Oct. 3, 2006

(54) VERTICAL FIELD OF REGARD MECHANISM FOR DRIVER'S VISION ENHANCER

(75) Inventors: Hubert Caron, Québec (CA); Leslie Wrobel, Québec (CA); Branislav Kovacevic, Québec (CA)

(73) Assignee: Thales Canada Inc., Ville Saint-Laurent (CA)

( * ) Notice: Subject to any disclaimer, the term of this patent is extended or adjusted under 35 U.S.C. 154(b) by 243 days.

(21) Appl. No.: 10/805,399

(22) Filed: Mar. 22, 2004

(65) Prior Publication Data

US 2005/0205789 A1    Sep. 22, 2005

(51) Int. Cl.
*G01J 5/02* (2006.01)
(52) U.S. Cl. .................. 250/347; 250/353
(58) Field of Classification Search ........... 250/353, 250/347
See application file for complete search history.

(56) References Cited

U.S. PATENT DOCUMENTS 4,928,174 A    5/1990  Smith et al.
5,227,888 A    7/1993  Haga et al.
5,675,149 A    10/1997 Wood et al.
5,757,004 A *  5/1998  Sandell et al. .......... 250/347
6,521,892 B1   2/2003  Emanuel et al.
6,563,102 B1 * 5/2003  Wrobel et al. .......... 250/208.1

FOREIGN PATENT DOCUMENTS

DE    41 02 196 A1    8/1991
WO    00 36897 A      6/2000

* cited by examiner

*Primary Examiner*—David Porta
*Assistant Examiner*—Mindy Vu
(74) *Attorney, Agent, or Firm*—Lowe Hauptman & Berner LLP.

(57) ABSTRACT

A driver vision enhancing system having a variable field of regard and a method of controlling the field of regard of a driver vision enhancing system. The system includes a housing, a movable sensor assembly located within the housing, a radiation detector connected to one end of the sensor assembly, and an actuator connected to the housing and able to contact the sensor assembly to move the sensor assembly in the housing and thereby move the radiation detector. The method includes moving a radiation detector as part of a driver vision enhancing system in a vertical direction within an image plane of the driver vision enhancing system.

21 Claims, 6 Drawing Sheets

VERTICAL FIELD OF REGARD MECHANISM FOR DRIVER'S VISION ENHANCER

FIELD OF THE INVENTION

The present invention relates to a method of and apparatus for adjusting the field of regard of driver's vision enhancing systems.

BACKGROUND

It is known in the art to use night vision systems to allow the driving of vehicles at night and under adverse weather conditions. One such night vision system, known as a Driver's Vision Enhancer (DVE) is described in U.S. Pat. No. 6,521,892 to Emanuel et al. The Emanuel DVE consists of a forward-looking thermal imager, also known as a Sensor Module (SM), for acquiring thermal radiation from a viewed scene and a Display and Control Module for displaying a visible image of the scene to the driver.

The portion of the scene called the Field of View can be acquired at any time and is expressed in elevation and azimuth angles. Such DVE systems are also equipped with mechanisms allowing the user to rotate the optical axis of the SM in elevation and azimuth to allow acquisition of the scene beyond the limits of the Field of View. The total scene area viewable by the DVE system is called the Field of Regard (FOR). The FOR includes the FOV and is frequently larger than the FOV, i.e., a non-movable DVE has a fixed FOR and FOV covering the same azimuth and elevation. For example, U.S. Pat. No. 6,563,102 to Wrobel et al. describes a FOR mechanism useable with the Emanuel DVE system described above.

Existing techniques for rotating the optical axis of the SM include rotating the SM itself in both azimuth and elevation, e.g., as used in the Wrobel patent, and rotating the associated folding mirror for vertical FOR and rotating the SM itself for the horizontal FOR, e.g., as used in DVE systems having periscopic optics having a vertical optical axis.

Several techniques can be used to rotate the optical axis of the Sensor Module. The one described in the aforementioned patent uses the rotation of the Sensor Module itself in both azimuth and elevation. DVE systems using periscopic optics (vertical optical axis) use the rotation of an associated folding mirror to provide vertical FOR and use the rotation of the SM itself for the horizontal FOR.

In order to utilize a mirror in the periscopic DVE systems, an entrance window is positioned in front of the mirror to prevent dust and contaminants from reaching the mirror. A lens assembly positioned to receive light from the mirror directs an image to a radiation detector for processing and ultimately display to a user. In operation, light from a viewed scene passes through the entrance window, reflects off the mirror, and passes through the lens assembly to the radiation detector. A reduction in light received from a viewed scene occurs as the light passes through the multiple components of the folding mirror mechanism.

There is a need in the art for an alternate FOR mechanism and associated SM packaging, which is applicable to forward looking DVE systems. Further, there is a need in the art for such a system that is improved in terms of simplicity, cost, and performance.

SUMMARY

It is therefore an object of the present invention to provide an improved FOR mechanism.

Another object of the present invention is to provide such an improved FOR mechanism having reduced cost and improved performance.

The present invention provides a driver vision enhancing system having a variable field of view. The system includes a housing and a movable sensor assembly located within the housing. The sensor assembly includes a radiation detector connected to one end of the assembly. An actuator connected to the housing is able to contact the sensor assembly and move the sensor assembly in the housing and thereby move the connected radiation detector.

A method aspect includes moving a radiation detector as part of a driver's vision enhancing system in a vertical direction within an image plane of the optics of the driver's vision enhancing system.

There are numerous advantages to the below-described FOR mechanism, a brief summary of the advantages includes:

small part count;
compact and high performance;
low cost;
reliable; and
simple electronics packaging.

As seen in FIGS. 2 and 3, the mechanism embodiment according to the present invention includes fewer parts in comparison to the above-described folding mirror-based system. One of the more complex parts, the sensor tube, is also used to hold the electronic boards and serves as a heat sink for the infrared detector.

Because the system does not include any mirror and entrance window, the system can be made very small in comparison with folding mirror-based systems. Additionally, the resulting optical transmission of the optics means more energy on the detector for higher performance. That is, fewer optical components impact the light passing through the system, thereby allowing more received light to reach the detector.

Lower cost is possible because the sliding mechanism involves only cylindrical shapes easily machined with high accuracy.

Reliability is increased because the moving parts are fully enclosed in the main housing and cannot be subjected to contamination from the environment or subjected to accidental shock or abuse.

Simple packaging is available because the infrared detector is mounted directly in the sensor engine board without the need for a separate detector board, connector, or flexible interconnecting circuit for lower cost and higher reliability.

Still other advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

In contrast with the above-described approaches, the mechanism of the present invention slides the infrared detector located in the SM vertically, in the focal plane of the forward-looking optics to provide elevation FOR.

Figure 1:
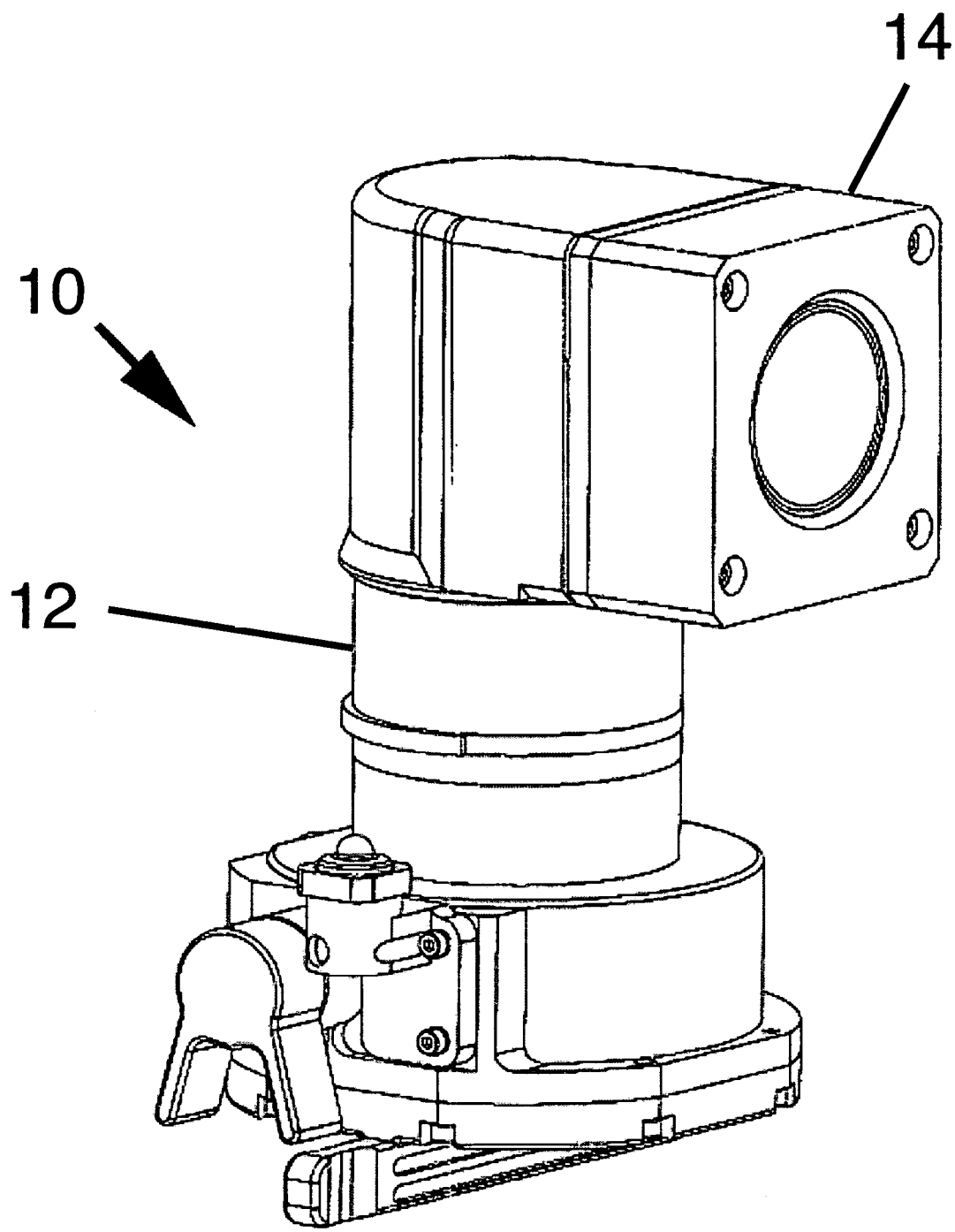
FIG. 1 is a perspective view of an example sensor module according to an embodiment of the present invention.

FIG. 1 is a perspective view of an example embodiment of the present invention. Sensor module 10 includes a main housing 12 and a lens assembly 14, e.g., a forward-looking optics module, attached to the main housing.

Figure 2:
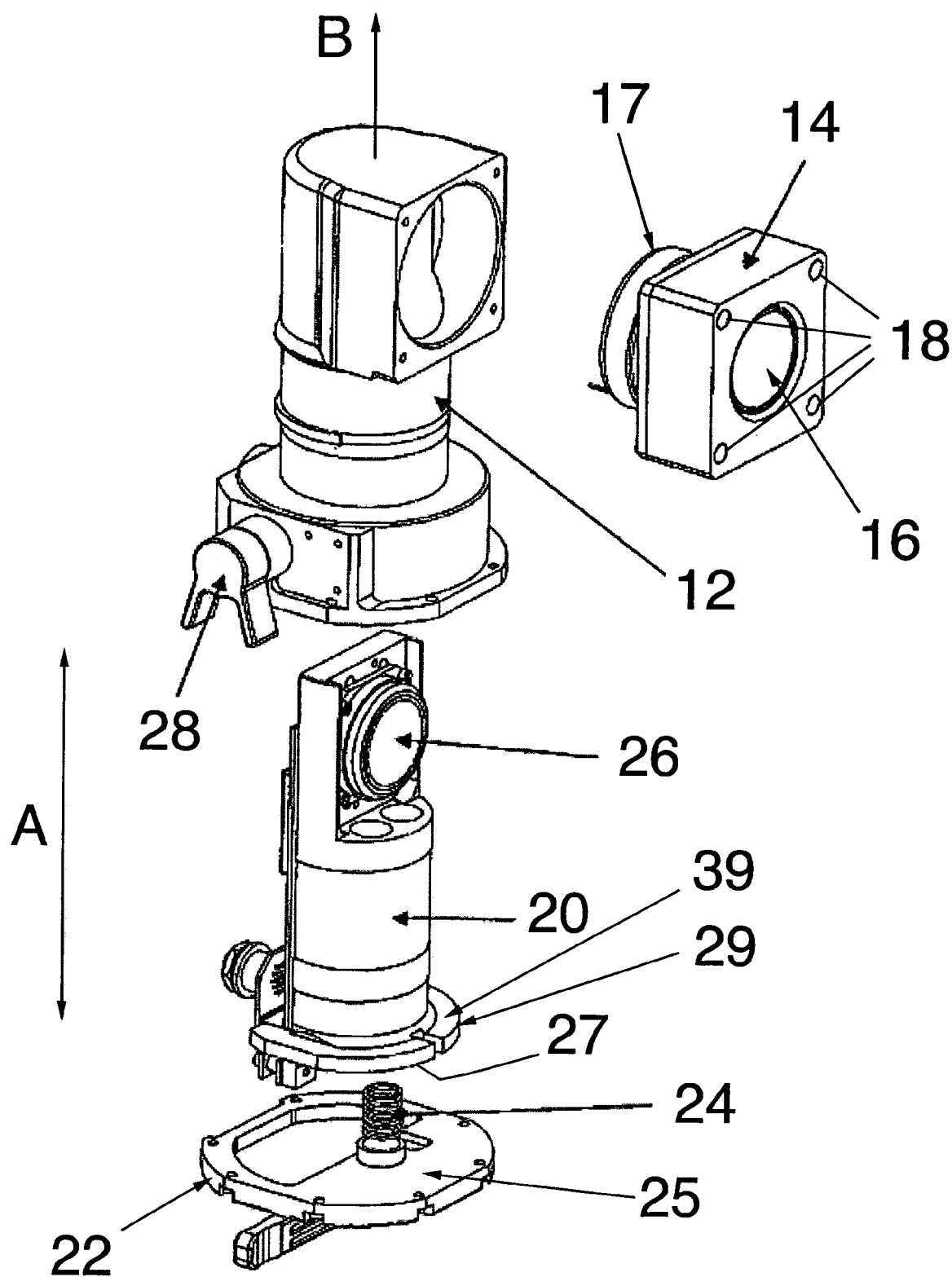
FIG. 2 is an exploded part view of the sensor module of FIG. 1.

FIG. 2 is an exploded part view of the sensor module 10 of FIG. 1 whereby lens assembly 14 has been removed from sensor module 10. Lens assembly 14 includes an aperture 16 in one face for receiving and providing electromagnetic waves, e.g., infrared waves, to the interior of sensor module 10 by way of a lens system 17 installed in lens assembly 14. Lens assembly 14 is connected to main housing 12 via four attaching devices 18, e.g., bolts, screws, or other form of attaching mechanism.

Similarly, a sensor tube assembly 20 has been removed from within the main housing 12 for better illustration of the features of the sensor tube assembly and bottom cover 22 has been removed from housing 12. In the assembled configuration as depicted in FIG. 1, bottom cover 22 is affixed, e.g., screwed or bolted, to the bottom of housing 12 to close and seal the housing. Sensor tube assembly 20 moves in a vertical direction A along a longitudinal axis B of main housing 12 within a vertical cylindrical bore of the housing. It will be understood by persons skilled in the art that sensor tube assembly 20 may be a different shape, e.g., dovetail, rectangular, hexagonal, octagonal, poly-sided shapes, fitting within housing 12 and allowing movement of assembly 20 within housing 12. Further, it will be understood that housing 12 may be a different shape in order to fit a particular embodiment.

A spring 24, e.g., a compression spring, is located on an upper portion 25 of bottom cover 22 and applies force to a bottom 27 (shown more clearly with reference to FIG. 3) of sensor tube assembly 20 for biasing the sensor tube assembly direction of movement and initial position within main housing 12 of sensor module 10. More specifically, spring 24 is compressed and inserted between bottom cover 22 and sensor tube assembly 20 to apply upward force on sensor tube assembly toward an actuator 28 (described in detail below with reference to FIGS. 4 and 6). Actuator 28 limits the upward movement of the sensor tube assembly 20 because the actuator is in contact with a sensor tube assembly flange 29. Bottom 27 of sensor tube assembly 20 extends beyond the outer perimeter of sensor tube assembly 20 thereby forming a flange 29 along an outer periphery of the bottom of the assembly.

An electromagnetic radiation detector 26, e.g., an infrared radiation detector, is mounted at an upper end of sensor tube assembly 20. A radiation sensitive area of detector 26, when positioned inside main housing 12, is aligned with the optical axis of lens system 17 of lens assembly 14. Lens assembly 14, and more specifically lens system 17 optics, creates an image larger than the radiation sensitive area of detector 26.

Main housing 12 includes a knob 30 external to, and positioned toward the base of, the main housing and connected to a cam 31 via a shaft 32 (described below in conjunction with FIGS. 4 and 6) for adjusting the position of sensor tube assembly 20, and ultimately detector 26, within sensor module 10. Cam 31 is positioned internal to main housing 12 and adjacent to an upper portion of flange 29. Cam 31 rotates in response to rotation of knob 30 due to connection with shaft 32. It is to be understood that in alternate embodiments, cam 31 may be movable in a different manner than rotation, e.g., vertical movement. Further, cam 31 in a particular embodiment is a movable device having an offset axis of rotation, e.g., a device having a camming action. It is to be further understood that in alternate embodiments, cam 31 may be replaced by alternate mechanisms including but not limited to a lever or rack and pinion.

In operation, manipulation of knob 30, e.g., clockwise or counter-clockwise rotation, causes actuator 28 to exert force against the upper portion of flange 29, and thereby against the biasing force of spring 24, to raise and lower sensor tube assembly 20. Raising and lowering assembly 20 raises and lowers infrared detector 26 within the image plane of aperture 16 of lens assembly 14. Consequently, the radiation sensitive area of infrared detector 26 is exposed to different segments of the overall image formed by the image plane of aperture 16 of lens assembly 14. Therefore, manipulation of knob 30 shifts the field of view of sensor module 10 vertically. It will be understood by persons of skill in the art that the field of view of sensor module 10 may also be shifted horizontally or at a predetermined angle through application of the herein described technique.

The mechanism of the present invention slides the infrared detector located in the sensor module 10 vertically, in the focal plane of the forward-looking optics to provide elevation FOR.

Sensor tube assembly 20 is now described in more detail with reference to FIG. 3. Infrared detector 26, e.g., a microbolometer, and two electronic Circuit Card Assemblies (CCA), i.e., a sensor engine CCA 35 and a power supply CCA 36, each attached to sensor tube assembly 20. Sensor engine CCA 35 provides processing capability necessary for generating an image from the infrared detector 26. Sensor engine CCA 35 includes the microbolometer detector and electronics necessary for creation of a video signal as is known to persons skilled in the art. Power supply CCA 36 provides power from an external power source (not shown) to sensor engine 35 connected thereto and infrared detector 26. Power supply CCA 36 includes a microcontroller for monitoring various controls on a display and control module (not shown) and adjusts various operating parameters of the sensor module 10. The display and control module displays the video signal obtained by the infrared detector 26 and includes controls manipulable by a user for adjusting the gain, level and brightness of the display, switching of polarity (black hot/white hot), and selection of the video source (internal/external). Advantageously, mounting the sensor engine CCA 35 and power supply CCA 36 to assembly 20 facilitates rapid removal and replacement of damaged/defective components. Further, mounting CCAs 35, 36 within the cylindrical bore of the main housing 12 requires less space outside the sensor module 10 for the board and associated components.

Figure 3:
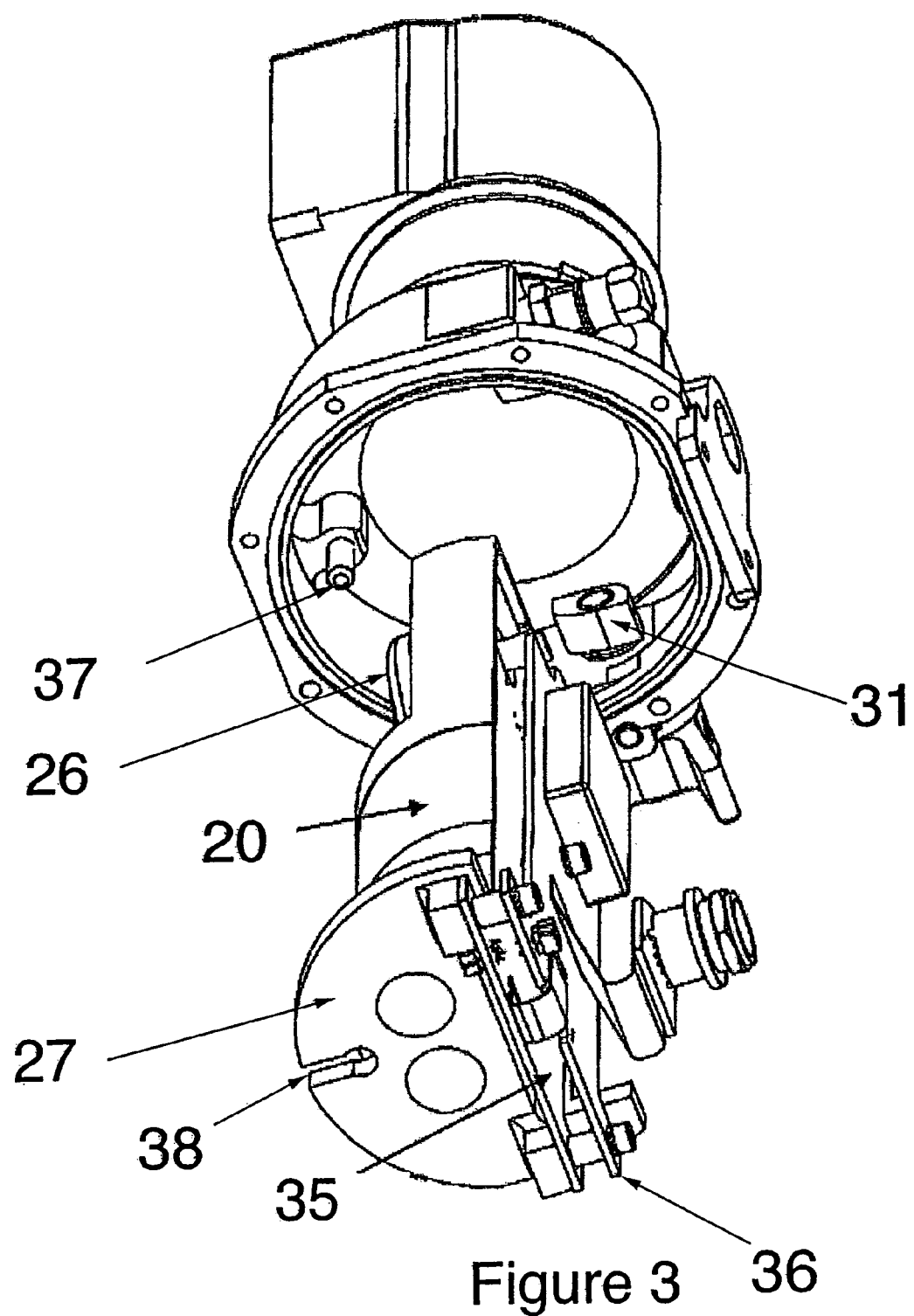
FIG. 3 is an exploded part view of the sensor module of FIG. 1 from a lower elevation.

With respect to FIG. 3, a pin 37 (also depicted in FIG. 4), e.g., a dowel pin or other projection, mounted in main housing 12 interfits with a slotted portion 38 of flange 29 of sensor tube assembly 20 and thereby prohibits rotation of the sensor tube assembly within the main housing. As sensor tube assembly 20 is slid into main housing 12, pin 37 projects into slotted portion 38 and cam 31 of actuator 28 is adjacent to upper portion 39 of flange 29. In one embodiment, actuator 28 is in constant contact with upper portion 39 of flange 29 while sensor tube assembly 20 is installed in main housing 12. In this embodiment, spring 24 exerts a constant force to the bottom 27 of assembly 20 pushing flange 29 toward, and in contact with cam 31 of actuator 28.

Figure 4:
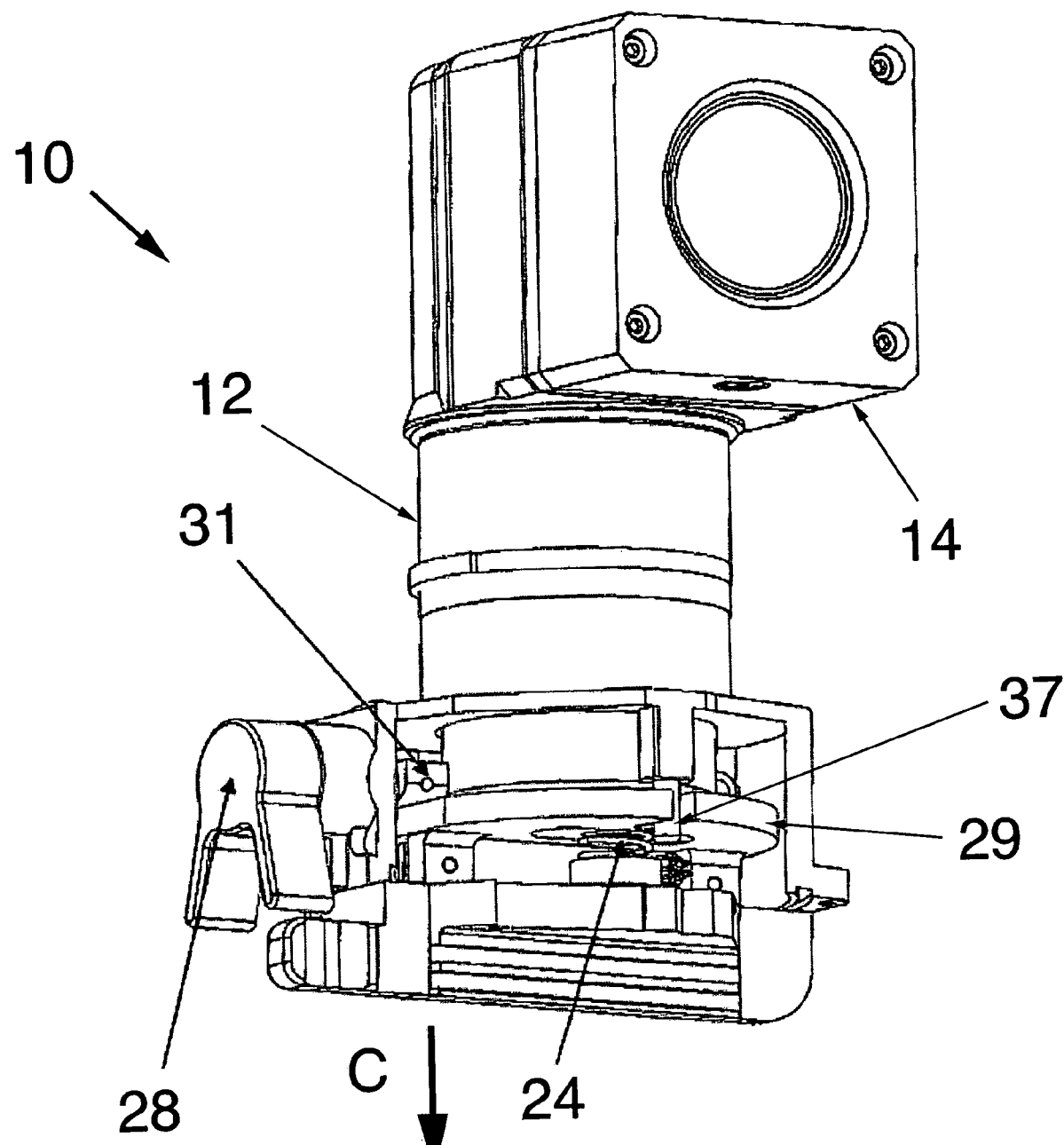
FIG. 4 is a perspective view from a lower elevation of the sensor module of FIG. 1.
Figure 5:
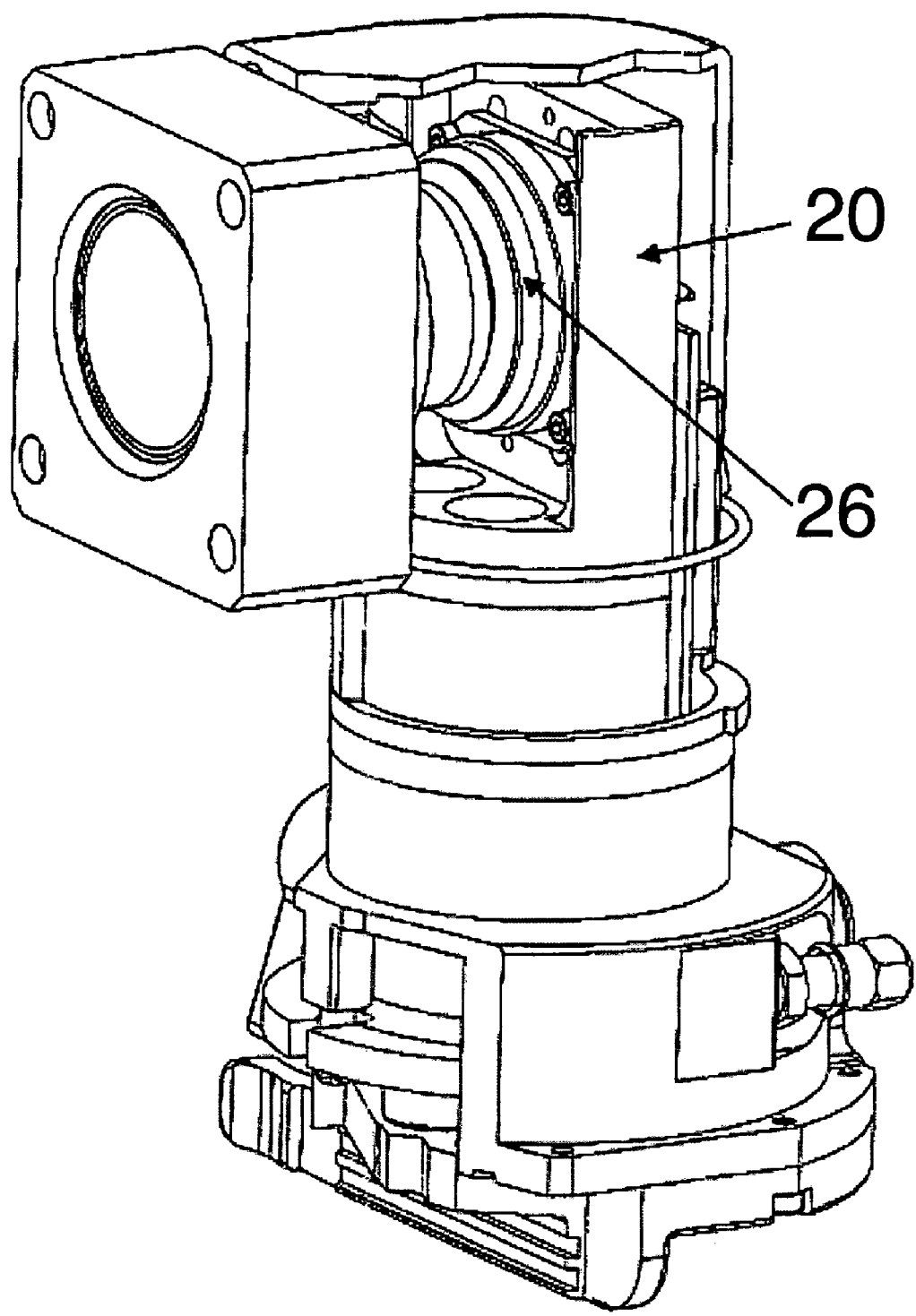
FIG. 5 is an other side perspective view of the sensor module of FIG. 1.

As depicted in FIG. 4, rotation of knob 30 causes rotation of actuator 28, and more specifically cam 31, in contact with flange 29 of the sensor tube assembly 20. Rotation of cam 31 applies a vertical force in direction C to flange 29 thereby compressing spring 24 as shown. In an alternate embodiment, spring 24 is located above flange 29 and exerts force on the upper surface of the flange and actuator 28 is located below flange 29 and in contact with the lower surface of the flange. In operation, actuator 28 exerts a vertical force opposite to direction C to flange 29 thereby compressing spring 24 and vertically moving sensor tube assembly 20.

As described above, actuator 28 enables the operator to move the sensor tube assembly 20 inside the main housing 12 thereby moving the infrared detector 26 vertically in the image plane so as to provide the required elevation FOR. Generally, in military Combat Vehicles, the sensor module 10 is interfaced to the vehicle through a mounting block (not shown). In such systems, the azimuth FOR is realized by rotating the sensor module 10 within the mounting block.

In an alternative embodiment, actuator 28 moves sensor assembly 20 without directly contacting the assembly. For example, actuator 28 may be a pneumatic, fluid pressure, electromagnetic or other non-contact system for moving assembly 20 without necessitating direct contact of actuator 28 with the assembly.

Figure 6:
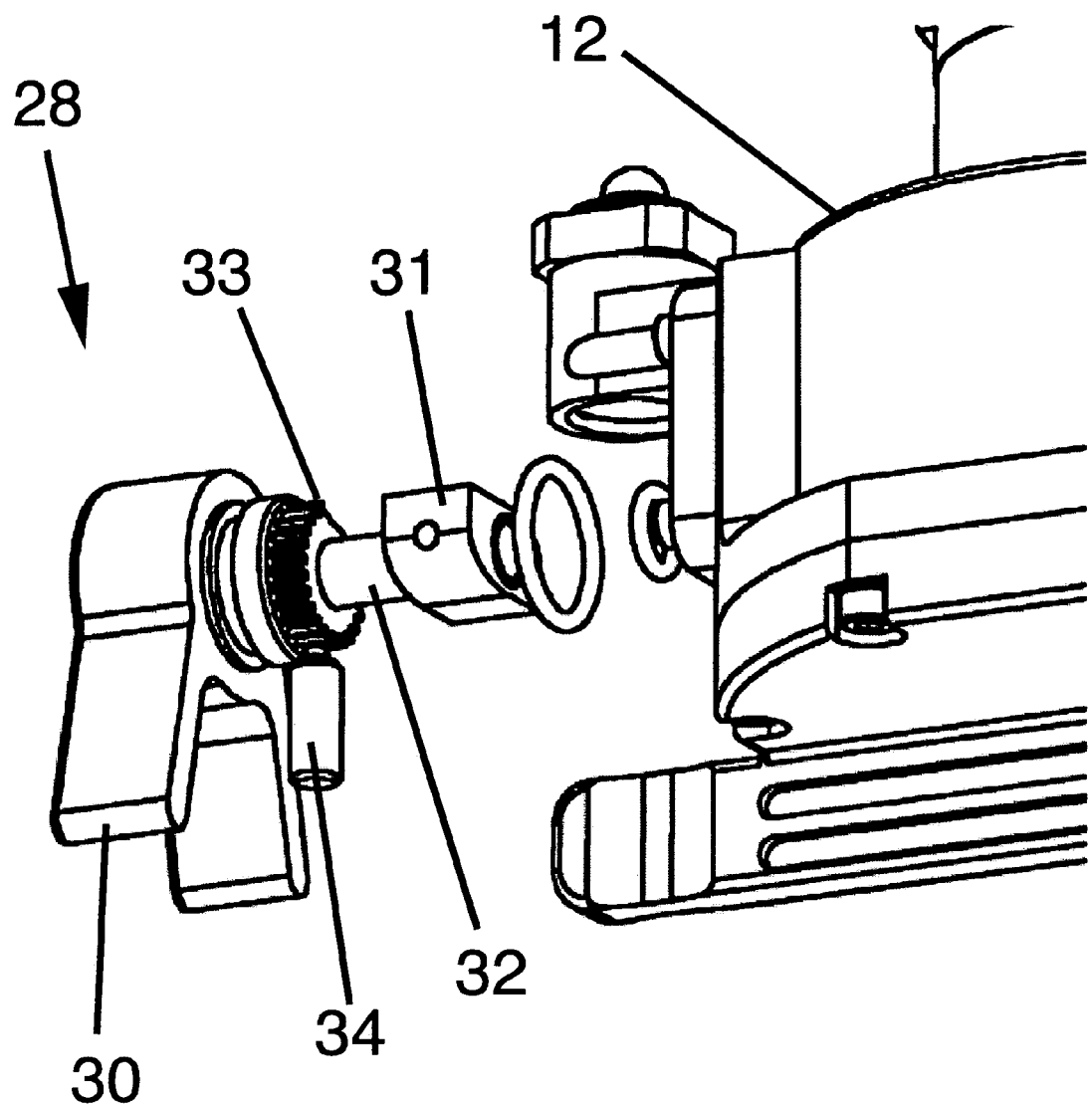
FIG. 6 is an exploded part view of an actuator of the sensor module of FIG. 1.

FIG. 6 is a lower side perspective view depicting an embodiment of actuator 28 of the present invention separate from main housing 12. As described above, actuator 28 includes knob 30 connected to cam 31 via shaft 32. In operation, movement of knob 30 causes rotation of shaft 32 and concurrent rotation of cam 31. In the particular embodiment depicted in FIG. 6, actuator 28 further includes a gear 33, e.g., a segment gear, attached to shaft 32 and a plunger 34, e.g., a spring plunger, connected to main housing 12. Plunger 34 is biased toward gear 33 and the top of plunger 34 interacts with the teeth of gear 33 to prevent counter-rotation of shaft 32 and cam 31 in reaction to spring 24 exerting force against assembly 20.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A vision system having a variable field of regard, comprising:
    a housing having a lens assembly;
    a movable sensor assembly located within the housing;
    a radiation detector connected to one end of the sensor assembly, wherein the radiation detector is configured to generate a signal used for generating an image; and
    an actuator connected to the housing and able to move the sensor assembly in the housing and thereby move the radiation detector in an image plane relative to the optical axis of the lens assembly.

2. The system of claim 1, wherein the radiation detector is an infrared detector.

3. The system of claim 1, wherein the actuator contacts one end of the sensor assembly.

4. The system of claim 1, wherein the sensor assembly further comprises a flange on an Outer portion of the sensor assembly for contact with motion of the actuator.

5. The system of claim 1, further comprising: a spring connected to the housing for exerting force against one end of the sensor assembly.

6. The system of claim 5, further comprising: a projection connected to the housing and interfit with the sensor assembly to prevent rotation of the sensor assembly in the housing.

7. The system of claim 6, wherein a portion of the sensor assembly interfits with the housing projection.

8. The system of claim 5, wherein the actuator remains in contact with the sensor assembly as a result of the spring exerting force against the sensor assembly.

9. The system of claim 1, wherein the sensor assembly is vertically movable within the housing.

10. The system of claim 1, wherein the lens assembly is connected at one end of the housing and positioned such that a radiation sensitive area of the detector is alignable within an image plane of the lens assembly.

11. The system of claim 10, wherein the actuator is movable to contact the sensor assembly and move the sensor assembly in a vertical direction thereby moving the detector in a vertical direction within an image plane of the lens assembly.

12. The system of claim 1, wherein the actuator is not in contact with the sensor assembly.

13. The system of claim 12, wherein the actuator is one of a pneumatic, fluid pressure, and electromagnetic type actuator.

14. The system of claim 12, wherein the actuator is able to move the sensor assembly in the housing without contacting the sensor assembly.

15. The system of claim 1, wherein the sensor assembly is a vertically oriented cylinder.

16. The system of claim 1, wherein the sensor assembly is cylindrical-shaped.

17. A method for controlling the field of view of a vision system, comprising the step of:
    moving a radiation detector as part of a driver vision enhancing system in a vertical direction within an image plane of the driver vision enhancing system.

18. The method of claim 17, wherein the radiation detector is connected to a sensor tube assembly and the moving step further comprises: moving an actuator to contact a sensor tube assembly causing the sensor tube assembly to move in a vertical direction and thereby move the radiation detector.

19. The method of claim 18, wherein the actuator moving step further comprises: compressing a spring biasing the sensor tube assembly in a vertical direction.

20. The method of claim 19, wherein motion of the actuator in contact with the sensor tube assembly compresses the spring.

21. The method of claim 18, wherein the sensor tube assembly is mounted within a housing having a vertically extending projection interfit with the sensor tube assembly and the actuator moving step further comprises: vertically moving the sensor tube assembly along the housing projection without allowing rotation of the sensor tube assembly.

* * * * *